United States Patent [19]

Kuriyama et al.

[11] Patent Number: 5,335,939
[45] Date of Patent: Aug. 9, 1994

[54] AIR BAG DEVICE

[75] Inventors: Yuuji Kuriyama; Shoji Sakaida; Hikaru Ando; Masao Ando; Kazumi Ichimaru, all of Inazawa; Kazutoshi Sakamoto, Ikeda, all of Japan

[73] Assignee: Toyoda Gosei Co., Ltd., Nishikasugai, Japan

[21] Appl. No.: 974,726

[22] Filed: Nov. 13, 1992

[30] Foreign Application Priority Data

Nov. 13, 1991 [JP] Japan ................................. 3-297356
Dec. 13, 1991 [JP] Japan ................................. 3-330503
Jan. 20, 1992 [JP] Japan ............................. 4-001472[U]

[51] Int. Cl.5 ............................................. B60R 21/16
[52] U.S. Cl. ................... 280/728 B; 280/732
[58] Field of Search ........... 280/728 A, 728 B, 730 R, 280/732

[56] References Cited

U.S. PATENT DOCUMENTS

| | | | |
|---|---|---|---|
| 4,327,937 | 5/1982 | Scholz et al. | 280/728 B |
| 4,842,299 | 6/1989 | Okamura et al. | 280/728 B |
| 4,893,833 | 1/1990 | DiSalvo et al. | 280/728 B |
| 5,066,037 | 11/1991 | Castrigno et al. | 280/728 B |
| 5,096,221 | 3/1992 | Combs et al. | 280/732 |
| 5,158,322 | 10/1992 | Sun | 280/732 |
| 5,209,519 | 5/1993 | Shiga et al. | 280/728 |

FOREIGN PATENT DOCUMENTS 4128945  4/1992 Fed. Rep. of Germany ... 280/728 B
63-111353 7/1988 Japan .

Primary Examiner—Margaret A. Focarino
Assistant Examiner—Paul Dickson
Attorney, Agent, or Firm—Cushman, Darby & Cushman

[57] ABSTRACT

An air bag device for an instrument panel has a cover with a hinge and in one embodiment a break-away portion made of thermoplastic material. The cover has a bracket. The strength of the break-away portion is lower than that of the cover. The break-away portion breaks when an air bag inflates. The cover opens rotationally around the hinge. The second embodiment has no break-away portion.

10 Claims, 3 Drawing Sheets

AIR BAG DEVICE

BACKGROUND OF THE INVENTION

1. Field of the Invention

This invention relates to an air bag device. More particularly, this invention relates to an air bag device being equipped in a vehicle instrument panel.

2. Description of Related Art

A cover of an air bag device is generally fixed to an opening for an instrument panel, and has a hinge or a break-away portion as described, for example, in U.S. Pat. No. 5,096,221 and Japanese Utility Model JIKKAI-SHO 63-111353.

However, by use of the hinge or breakaway portion, the number of composite parts increases, and it requires much time and labor to install these parts to the cover.

SUMMARY OF THE INVENTION

An object of the present invention is to provide an air bag device wherein a cover is easily fixed to an opening of an instrument panel, and is lighter in weight because of a reduction in the number of the composite parts of a hinge or break-away portion.

Another object of the present invention is to provide an air bag device for which a cover opens smoothly.

Other objects, features, and characteristics of the present invention, as well as the methods and operation and functions of the related elements of the structure, and to the combination of parts and economies of manufacture, will become apparent upon consideration of the following description and the appended claims with reference to the accompanying drawings, all of which form a part of this specification, wherein like reference numerals designate corresponding parts in the various figures.

DETAILED DESCRIPTION OF THE INVENTION

First embodiment

Figure 1:
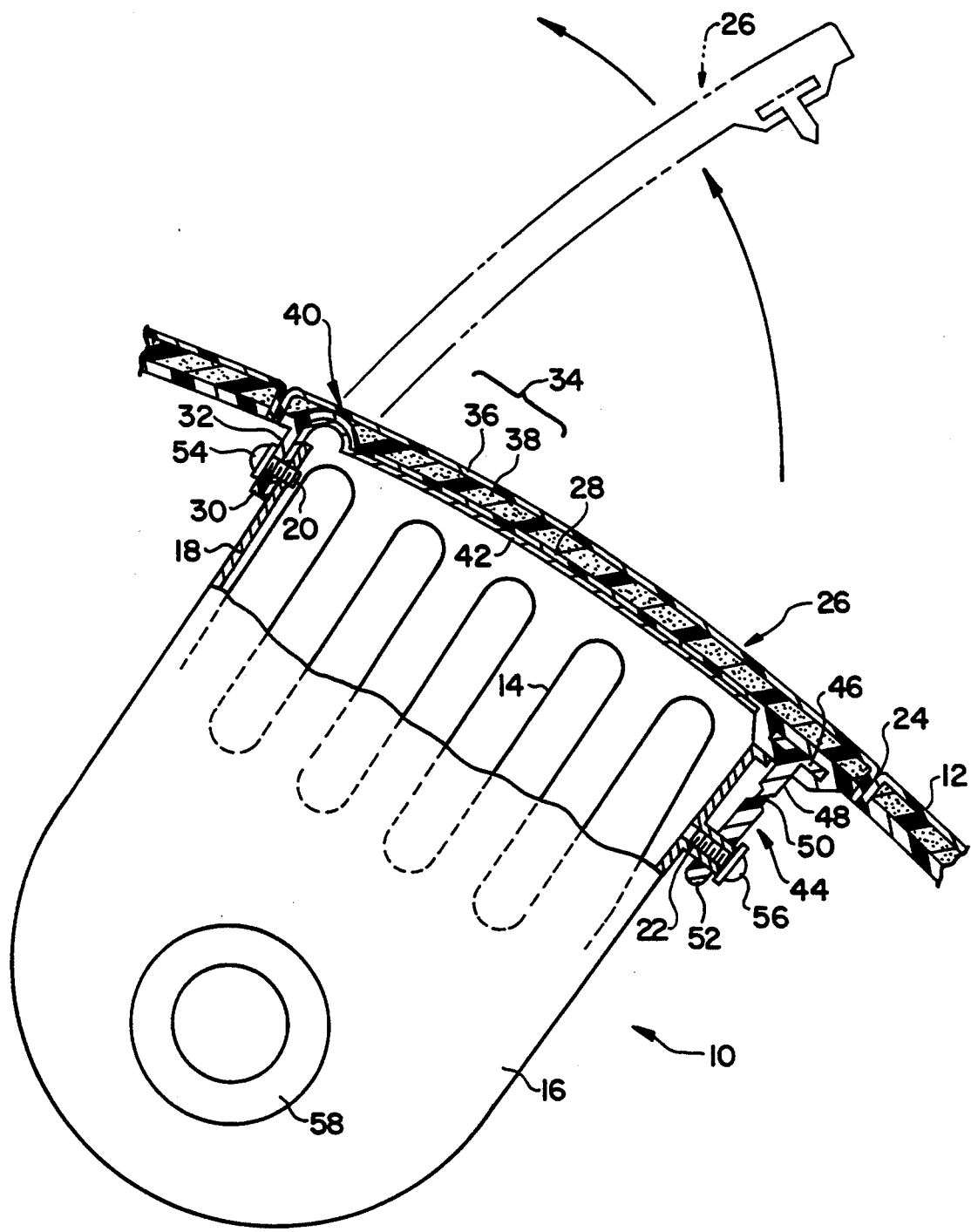
FIG. 1 shows a cross-sectional view of an air bag device according to a first embodiment of this invention.

As shown in FIG. 1, an air bag device 10 is equipped in an instrument panel 12, for example on the passenger side of the front seat of a vehicle. A case 16 including an air bag 14 and an inflator 58 is fixed to a body (not shown), and a cover 26 is held at an opening 24 of a surrounding wall 18 of the case 16. The cover 26 includes a base portion 28 and a surface layer 34 and has an "L" shaped cross-section the lower leg of which includes bracket 30.

The base portion or layer 28 is made of TPO (thermoplastic olefin). The base portion may be made of PPF (fiber reinforced polypropylene), polyester, polymer alloy material of PPO (polyphenylene oxide) and polyamide or polyethylene. The surface layer 34 includes an outer skin layer 36 made of TPO and an inner sponge layer 38 made of PP (polypropylene). The skin layer 36 may be made of PVC (polyvinyl chloride) or urethane, and the sponge layer 38 may be made of PVC foam or urethane foams. From an adhesive point of view, when the sponge layer 38 is made PP foam, the material of the base portion is preferably PPF or TPO. When the sponge layer 38 is made of PVC foam, the material of the base portion 28 is preferably polyester.

A hinge 40, which extends the full length of cover 26 and forms a rotation axis for cover 26 when air bag 14 is inflated, is integral with bracket 30 of the cover 26. The hinge 40 is a semicircular or inverted U-shape hump portion. The base portion 28 and net 42 also of inverted U-shape at the hinge fit into a recess formed by removing at least a portion of the sponge layer 38 at the hinge hump portion. A net 42 made of polyamide (6 nylon) is partially embedded in the base portion 28. The net 42 reinforces cover 26 throughout as well as hinge 40 and prevents destruction of the hinge when the bag is inflated. Net 42 also reinforces bracket 30. Bracket 30 also has fixing holes 32.

Break away portion 44 is connected to the cover at the side opposite hinge 40. The break-away portion 44 is made of synthetic resin like a polyester so as to be breakable easier than the material of the base portion 28, and includes a flat flange portion 46 inserted in the base portion 28, a neck portion 48 extending from the flange portion 46, and a fixing portion 52 having a fixing hole. The neck portion 48 has a thin portion 50 in order to be breakable. The break-away portion 44 is made of TPO (Sumitomo TPE 3885). As examples, the tensile strength of the break-away portion 44 is 95Kg/cm$^2$, and that of the base portion 28 (made of TPO: Sumitomo TPE 3255) is 200Kg/cm$^2$ by tensile test according to JIS K 6301/No. 2 Dambel 50 mm/min tensile speed.

At hinge 40, the cover 26 is fixed to the case 16 by any convenient means, such as, for example, screws 54 which engage with holes 20 in wall 18 through the fixing holes 32 of the bracket 30. On the opposite side of the case, adjacent break-away portion 44, the cover 26 is fixed with screws 56 to the fixing portion 22 through the fixing portion 52, and is disposed to close the opening 24.

The cover 26 is produced as follows. The surface layer 34 is vacuum molded to the shape of the cover 26. The surface layer 34 is arranged, together with the net 42 and the break-away portion 44 in a mold which molds the base portion 28. The base material 28 is produced by a stamping mold or injection mold.

The air bag device 10 is installed in the vehicle after the cover 26 is fixed to the case 16 which contains the folded air bag 15 and the inflator 58. In the air bag device 10, the air bag 14 is deployed by the gas from inflator 58, and the break-away portion 44 is broken at the thin portion 50 by the deployment force of the air bag 14, causing cover 26 to open rotationally around hinge 40. Since the break-away portion 44 is connected as an insert in the synthetic resin cover 26 and is secured in place at the same time as the molding of cover 26, there is no need to use screws to fix the break-away portion 44 to cover 26, and the number of parts can be reduced. Besides, as the break-away portion 44 is made of a material having a strength lower than that of the base portion 28, the break-away portion 44 easily breaks at the time of deployment of the air bag 14. The break-away portion 44 is easily configured and constructed by selecting the material or shape freely.

In the above-described embodiment, cover 26 is fixed to the surrounding wall 18 of case 16; however, hinge 40 of cover 26, and/or the break-away portion 44 may be connected to the instrument panel 12. FIG. 1 shows the flange portion 46 as having a flat shape; however, the flange portion 46 may be changed to an inverted U-shape or the flat shape may have holes which fill with the material of base portion 28 for tighter connection to the base portion.

Second embodiment

Figure 2:
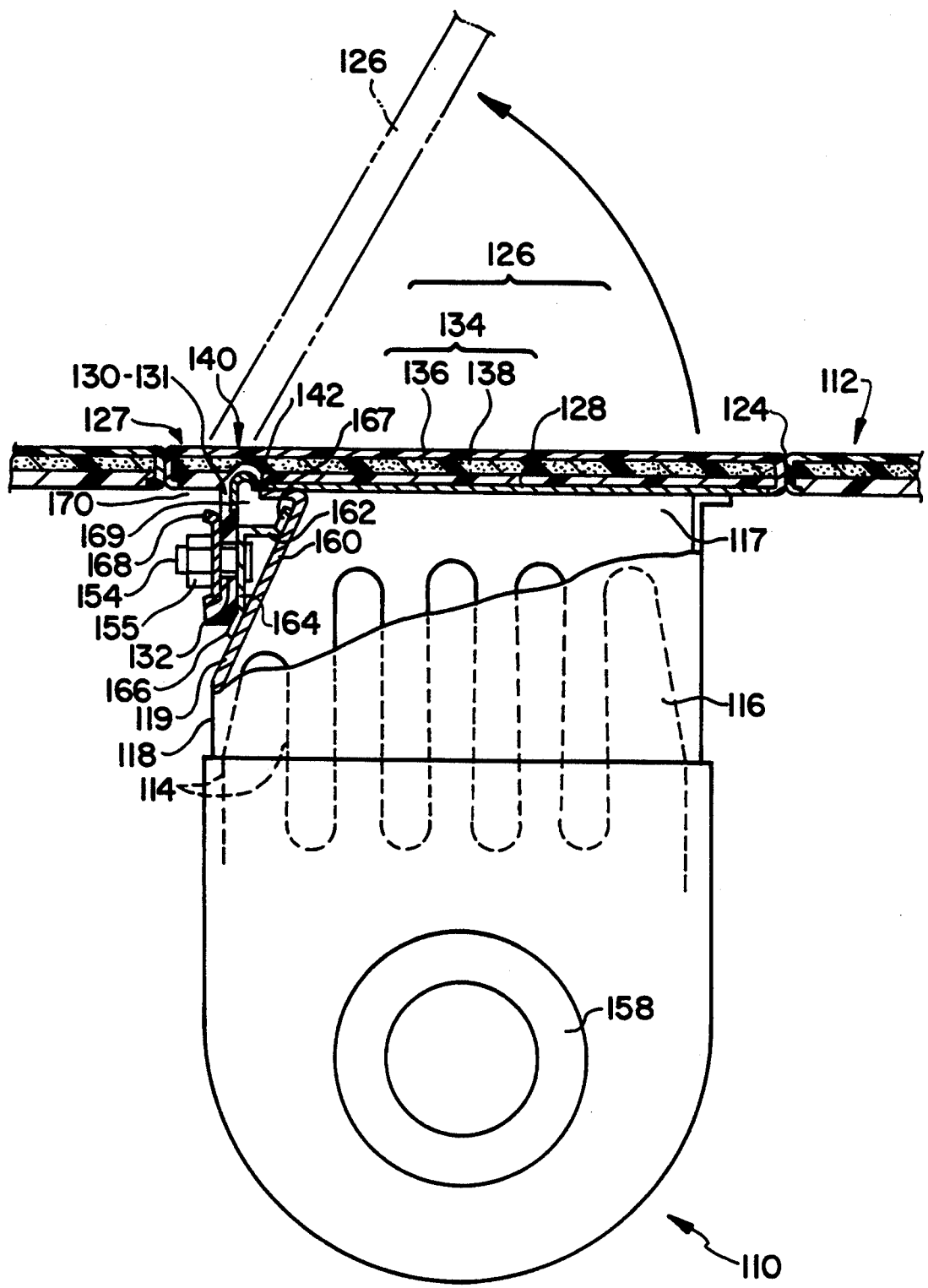
FIG. 2 shows a cross-sectional view of an air bag device according to the second embodiment of this invention.
Figure 3:
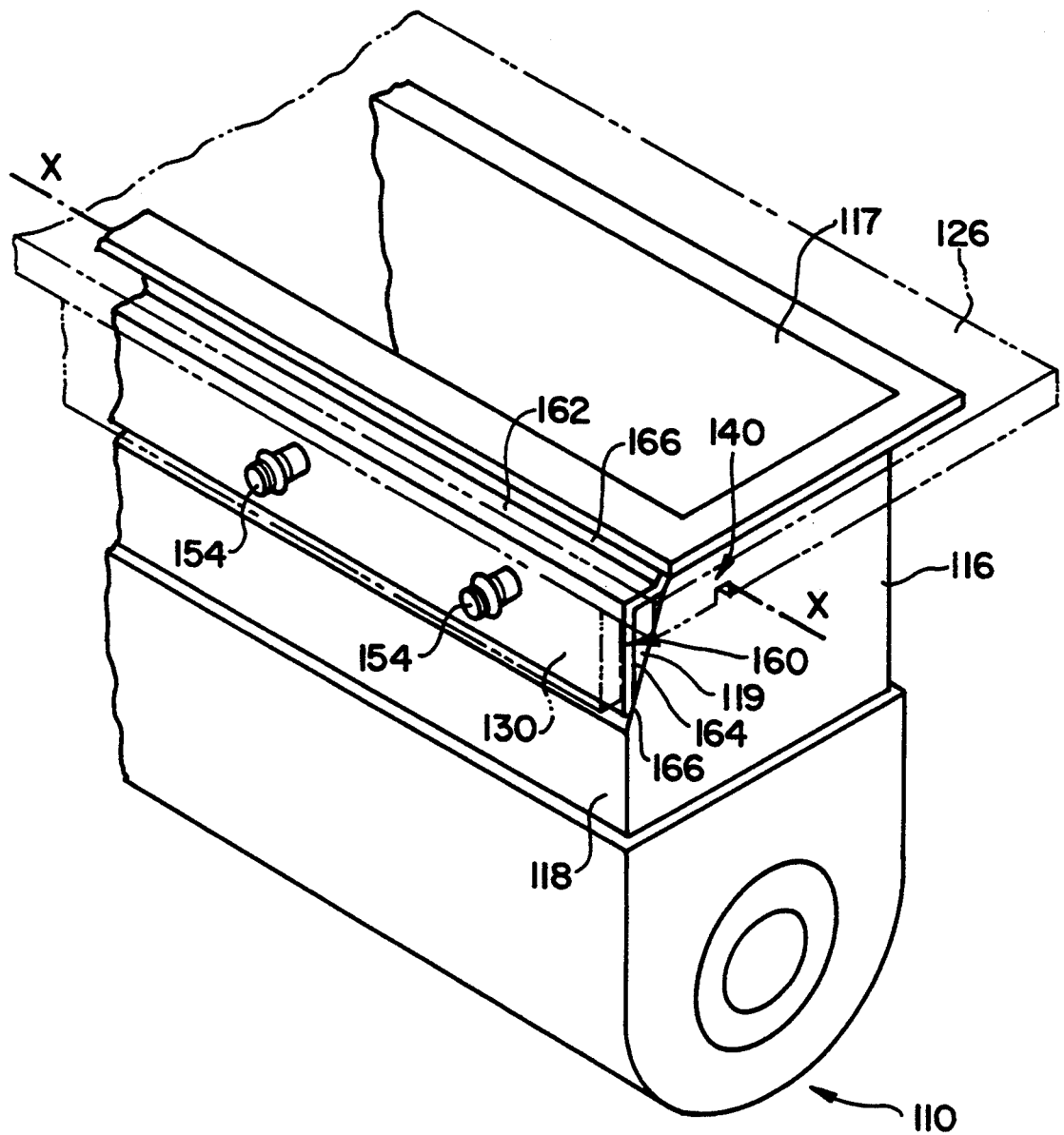
FIG. 3 shows a partial perspective view of an air bag device according to the second embodiment of this invention.

As shown in FIGS. 2 and 3, an air bag device 110, disposed in an upper portion of an instrument panel 112 in front of a passenger, includes a case 116 made of metal sheet and having an inflator 158, and a cover 126 over an opening 117 of the case 116. The cover 126 which is disposed in an opening 124 of the instrument panel 112 has a base portion 128 and a surface layer 134 and has an "L" shaped cross-section, the lower leg of which includes bracket 130.

The surface layer 134 includes an outer skin layer 136 and an inner sponge layer 138 which is bonded to the outer layer 136. At a side portion, cover 126 has a hinge 140 which forms a rotation axis for cover 126 when air bag 114 is inflated. Throughout cover 126 has a reinforcing net 142 made of polyamide (6 nylon) embedded in the base portion or layer 128. As shown, cover 126 has an extended portion which extends beyond hinge 140 (to the left in FIG. 2) away from case opening 117.

Bracket 130 extends from hinge 140 and both are covered by net 142. The bracket 130 has fixing holes 132. Case 116 has a bottom portion having a half columnar shape at the lower portion where an inflator 158 is installed and a rectangular-shaped upper portion having an opening portion 117.

A folded air bag 114 is disposed over the inflator 158. At the bottom, case 116 has a fixing bracket (not shown) by which case 116 is secured to a body (not shown). The case 116 has a sloped or angled wall member 119 narrowing the opening 117 at the side or end wall 118 near the hinge 140, and a channel member 160 made of metal sheet is fixed along the hinge 140 by spot welding or the like. The channel member 160 is "L" shaped in cross-section, having an upper leg 162 and a side leg 164, and legs 162, 164 have respective fin portions 166, 167 welded to the wall member 119.

Bolts 154 which pass through the fixing holes 132 are welded to the side leg 164. The cover 126 is connected to the side wall 118 by the slot 154 and a nut 155 with a fitting plate 168.

Channel member 160 is fixed to wall member 119 so that a space 169 exists between the channel member 160 and the hinge 140.

When the air bag 114 inflates, cover 126 deploys rotationally around hinge 140. If case 116 were allowed to deform, hinge 140 would also deform (bend) and that would prevent cover 126 from opening smoothly. Deformation of case 116 and hinge 140 is prevented, because channel member 160 reinforces wall member 119. When air bag 114 inflates, the base portion 131 of bracket 130 deforms (bends backward) and prevents concentration of stress in hinge 140 because of space 169 between the channel member 160 and hinge 140. Therefore, the rotation axis X—X (FIG. 3) of the cover 126 is maintained linear and stable, and the cover 126 can be opened smoothly.

This embodiment shows wall member 119 reinforced by channel member 160; however, channel member 160 may be connected to the vertical side wall 118 if there is no sloped portion. As there is a space 170 under the position between the hinge 140 and the edge portion 127, cover 126 would rotate smoothly around hinge 140.

While the invention has been described in connection with what is presently considered to be the most practical and preferred embodiments, it is to be understood that the invention is not to be limited to the disclosed embodiments, but on the contrary, is intended to cover various modifications and equivalent arrangements included with the spirit and scope of the appended claims.

What is claimed is:

1. An air bag device comprising:
   a case having an opening,
   a folded air bag provided in said case,
   an inflator provided in said case to generate gas for inflating said air bag, and
   a cover for closing said case opening, said cover having a thermoplastic layer a softer intermediate layer and an outer surface layer as well as a reinforcing net partially embedded in a major portion of an underside of said base layer,
   said cover having a reduced thickness portion defining a hinge including said reinforcing net.

2. An air bag device according to claim 1, wherein said cover is "L" shaped in cross-section and includes in one leg a cover portion closing said opening of said case and in another leg a bracket fixed to one side of said case and connected with one side of said cover portion through said hinge, said net being attached to said bracket and said case.

3. An air bag device according to claim 2, wherein said net extends from said bracket throughout said major portion of said base layer.

4. An air bag according to claim 1, wherein said reduced thickness portion is defined by a recessed portion of said intermediate layer, said base layer and said net including a substantially inverted U-shaped portion disposed within said recessed portion.

5. An air bag device according to claim 2, including a break-away portion which is connected to said cover and which breaks when said cover deploys.

6. An air bag device according to claim 5, wherein said break-away portion is made of thermoplastic material having a breakage strength lower than that of said cover.

7. An air bag device according to claim 6, wherein one end of the break-way portion is embedded in said cover portion.

8. An air bag device according to claim 2, wherein said case includes an "L" shaped channel member fixed to said bracket and extending along said opening adjacent said hinge.

9. An air bag device according to claim 8, wherein there is a space between said channel member and said hinge.

10. An air bag device according to claim 8, wherein said cover includes an extended portion extending over said hinge away from said case opening.

* * * * *